United States Patent
Ubelhart

(10) Patent No.: US 12,191,732 B2
(45) Date of Patent: Jan. 7, 2025

(54) MOTOR WITH STATOR FORMED FROM STATOR MOTORETTES AND COMPRESSION SPACERS FOR INCREASED HEAT TRANSFER EFFICIENCY

(71) Applicant: Schaeffler Technologies AG & Co. KG, Herzogenaurach (DE)

(72) Inventor: Eric Ubelhart, Orrville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 156 days.

(21) Appl. No.: 17/412,411

(22) Filed: Aug. 26, 2021

(65) Prior Publication Data
US 2023/0069671 A1 Mar. 2, 2023

(51) Int. Cl.
| | |
|---|---|
| *H02K 3/487* | (2006.01) |
| *H02K 1/14* | (2006.01) |
| *H02K 9/22* | (2006.01) |
| *H02K 15/00* | (2006.01) |
| *H02K 15/02* | (2006.01) |

(52) U.S. Cl.
CPC ............. *H02K 3/487* (2013.01); *H02K 1/148* (2013.01); *H02K 9/223* (2021.01); *H02K 15/0018* (2013.01); *H02K 15/022* (2013.01)

(58) Field of Classification Search
CPC .......... H02K 3/487; H02K 1/148; H02K 9/22; H02K 9/223; H02K 15/0018; H02K 15/022
USPC ............................ 310/214, 216.008, 216.009
See application file for complete search history.

(56) References Cited

U.S. PATENT DOCUMENTS

| 6,313,556 B1 | 11/2001 | Dombrovski et al. |
|---|---|---|
| 2002/0167232 A1* | 11/2002 | Randall .................. H02K 9/227 310/54 |
| 2003/0057797 A1* | 3/2003 | Kaneko .................. H02K 5/128 310/216.064 |
| 2003/0098630 A1* | 5/2003 | Owada ..................... H02K 3/24 310/194 |

(Continued)

FOREIGN PATENT DOCUMENTS

| CN | 110971027 | 4/2020 |
|---|---|---|
| JP | 2003164088 | 6/2003 |

(Continued)

OTHER PUBLICATIONS

Machine translation of WO-2014060399-A2. (Year: 2014).*
Machine translation of JP-2003164088-A. (Year: 2003).*

*Primary Examiner* — Michael Andrews
(74) *Attorney, Agent, or Firm* — Volpe Koenig

(57) ABSTRACT

An electric motor is provided that has a stator and a rotor rotatably mounted in the stator. The stator includes a plurality of motorettes, each having a ferrous metal core segment, and a conductive winding on the core segment. The plurality of motorettes are arranged in a circular arrangement, and a plurality of wedges are provided, with one of the wedges being positioned in each interface between the conductive windings of adjacent ones of the motorettes that presses the conductive windings of the adjacent ones of the motorettes towards respective ones of the ferrous metal core segments. This provides an arrangement with minimal or no air gaps between the conductive windings and the core segments, or an electric insulator on each of the core segments.

17 Claims, 3 Drawing Sheets

(56) References Cited

U.S. PATENT DOCUMENTS

| | | | | |
|---|---|---|---|---|
| 2013/0106210 A1* | 5/2013 | Tsutsui | ............... | H02K 3/38 |
| | | | | 310/52 |
| 2014/0319936 A1* | 10/2014 | Makino | ............... | H02K 9/00 |
| | | | | 310/43 |
| 2015/0256055 A1* | 9/2015 | Kino | ............... | B29C 45/14467 |
| | | | | 264/261 |
| 2017/0353092 A1* | 12/2017 | Park | ............... | H02K 1/24 |
| 2020/0091791 A1 | 3/2020 | Yin et al. | | |

FOREIGN PATENT DOCUMENTS

| | | | | | |
|---|---|---|---|---|---|
| JP | 2003164088 A | * | 6/2003 | ............... | H02K 3/24 |
| JP | 2004104917 | | 4/2004 | | |
| WO | WO-2014060399 A2 | * | 4/2014 | ............... | H02K 3/24 |

* cited by examiner

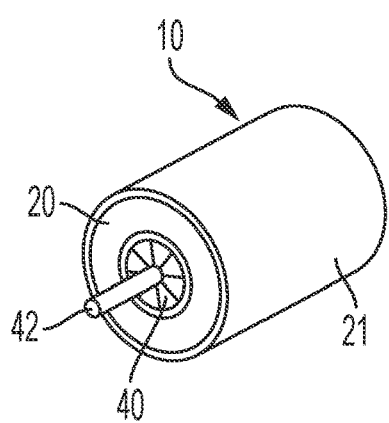
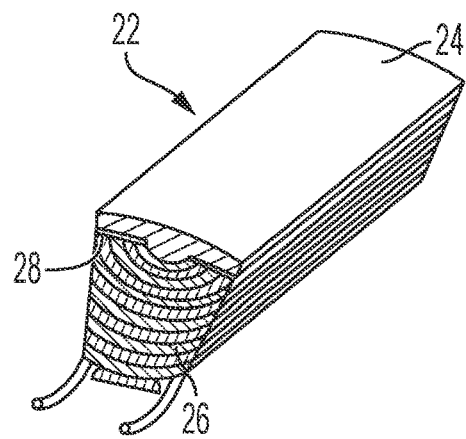
FIG. 1    FIG. 2
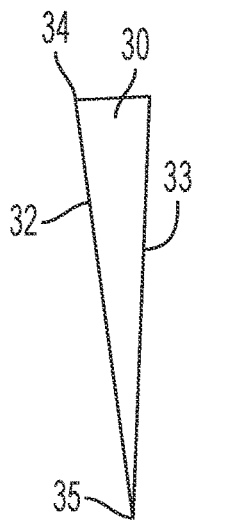
FIG. 3A    FIG. 3B
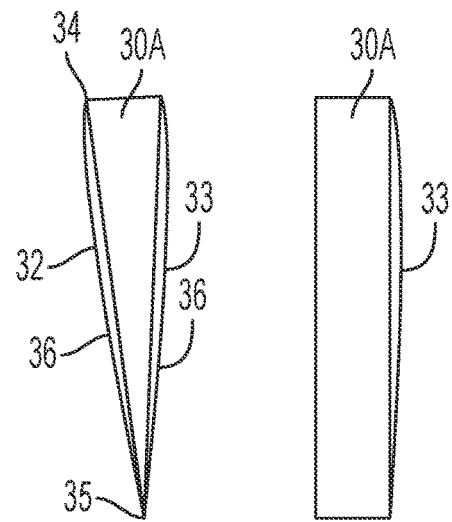
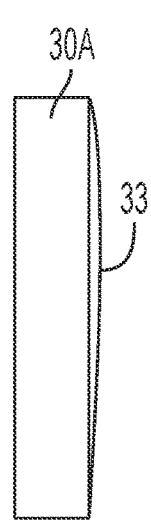
FIG. 4A    FIG. 4B
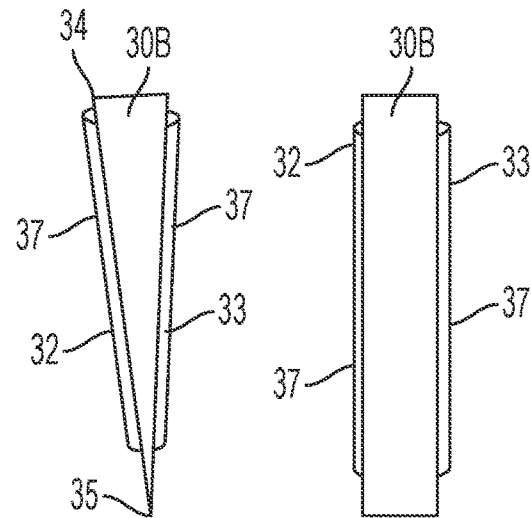
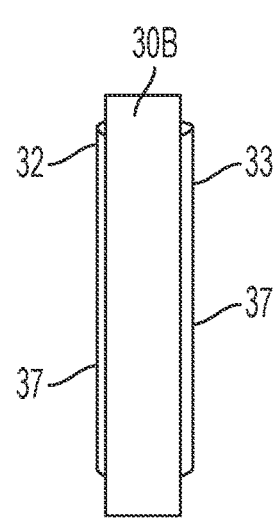
FIG. 5A    FIG. 5B

MOTOR WITH STATOR FORMED FROM STATOR MOTORETTES AND COMPRESSION SPACERS FOR INCREASED HEAT TRANSFER EFFICIENCY

FIELD OF INVENTION

The present disclosure relates to emotors (electric motors) used in electric or hybrid electric vehicles, and more specifically to a stator formed from motorettes made from core segments with conductive windings that form the stator of the emotor.

BACKGROUND

Material conductivity thermally influences the amount of material necessary to create the required magnetic field in an emotor to create mechanical power. For motor vehicle applications it is necessary to optimize performance to increase the vehicle range. Accordingly, reducing the thermal resistance of the emotor packaging stack-up can help to increase the power density allowing a reduction in weight or increased performance.

It has been found that during winding of the stator core segments for a concentrated winding emotor stator assembled from the pre-wound core segments (motorettes), current tensioning methods potentially leave a small air gap between the copper and plastic bobbin overmold of the core segment. This air gap is an issue for emotor performance based on heat transfer between materials in the assembled stator.

SUMMARY

In one aspect, the present disclosure is directed to reducing or eliminating this air gap to provide a tight fit of the stator coils and the stator core segment/bobbin on which the coils are wound with a minimal or no air gap in order to increase thermal heat transfer efficiency.

According to the disclosure, an electric motor is provided that has a stator and a rotor rotatably mounted in the stator. The stator includes a plurality of motorettes, each having a ferrous metal core segment, and a conductive winding on the core segment. The plurality of motorettes are arranged in a circular arrangement, and a plurality of wedges are provided, with one of the wedges being positioned in each interface between the conductive windings of adjacent ones of the motorettes that presses the conductive windings of the adjacent ones of the motorettes towards respective ones of the ferrous metal core segments. This provides an arrangement with minimal or no air gaps between the conductive windings and the core segments, or an electric insulator on each of the core segments.

In one embodiment, the wedges each have a constant taper.

In another embodiment, the wedges include two winding contact sides that extend between a radially outer end and a radially inner end, the radially outer end is wider than the radially inner end, and the winding contact sides have a convex shape. This results in more force being applied by the wedges on the conductive windings in the area where the convex shape extends or bows outwardly.

In another embodiment, the wedges include two winding contact sides that extend between a radially outer end and a radially inner end, the radially outer end is wider than the radially inner end, and the winding contact sides have a profile that is configured to apply a greater circumferential compression force on adjacent ones of the conductive windings in an area between the radially outer and radially inner ends. In this arrangement, the profile can be tailored to a particular application or motorette arrangement.

In one aspect, the wedges are formed of a polymeric material.

In another aspect, the wedges are formed of a thermally conductive material. This can be a polymeric, thermally conductive material.

In another aspect, an insulating potting material, which is preferably also thermally conductive, is injected to surround the conductive windings.

In another aspect, a method of assembling a stator of an emotor is provided, and includes: (a) wrapping a conductive winding around a ferrous metal core segment to form a motorette; (b) arranging a plurality of motorettes in a circular arrangement with a wedge being positioned in each interface between the conductive windings of adjacent ones of the motorettes; and (c) compressing the motorettes together such the wedges press the conductive windings of the adjacent ones of the motorettes towards respective ones of the ferrous metal core segments to form the stator.

The method can further include the ferrous metal core being overmolded with an electric insulator formed of a polymeric material. Alternatively, other types of insulators could be used, such as a paper insulator.

The method can also include injecting potting material around the conductive windings and the wedges.

The shape and construction of the wedges can also be selected from the various arrangements disclosed herein in order to minimize or eliminate air gaps between the conductive windings and the core segments in order to increase thermal heat transfer efficiency and improve the overall efficiency of the emotor.

It is noted that various ones of the above-noted features can be used alone or in combination with one another.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 1 is a schematic view of an electric motor in accordance with an embodiment of the present disclosure.

FIG. 2 is a perspective view of a motorette used for assembling the stator of the electric motor shown in FIG. 1.

FIG. 3A is a side view of a first embodiment of a wedge used for assembling the stator.

FIG. 3B is a top view of the wedge shown in FIG. 3A.

FIG. 4A is a side view of a second embodiment of a wedge used for assembling the stator.

FIG. 4B is a top view of the wedge shown in FIG. 4A.

FIG. 5A is a side view of a third embodiment of a wedge used for assembling the stator.

FIG. 5B is a top view of the wedge shown in FIG. 5A.

DETAILED DESCRIPTION

Figure 6:
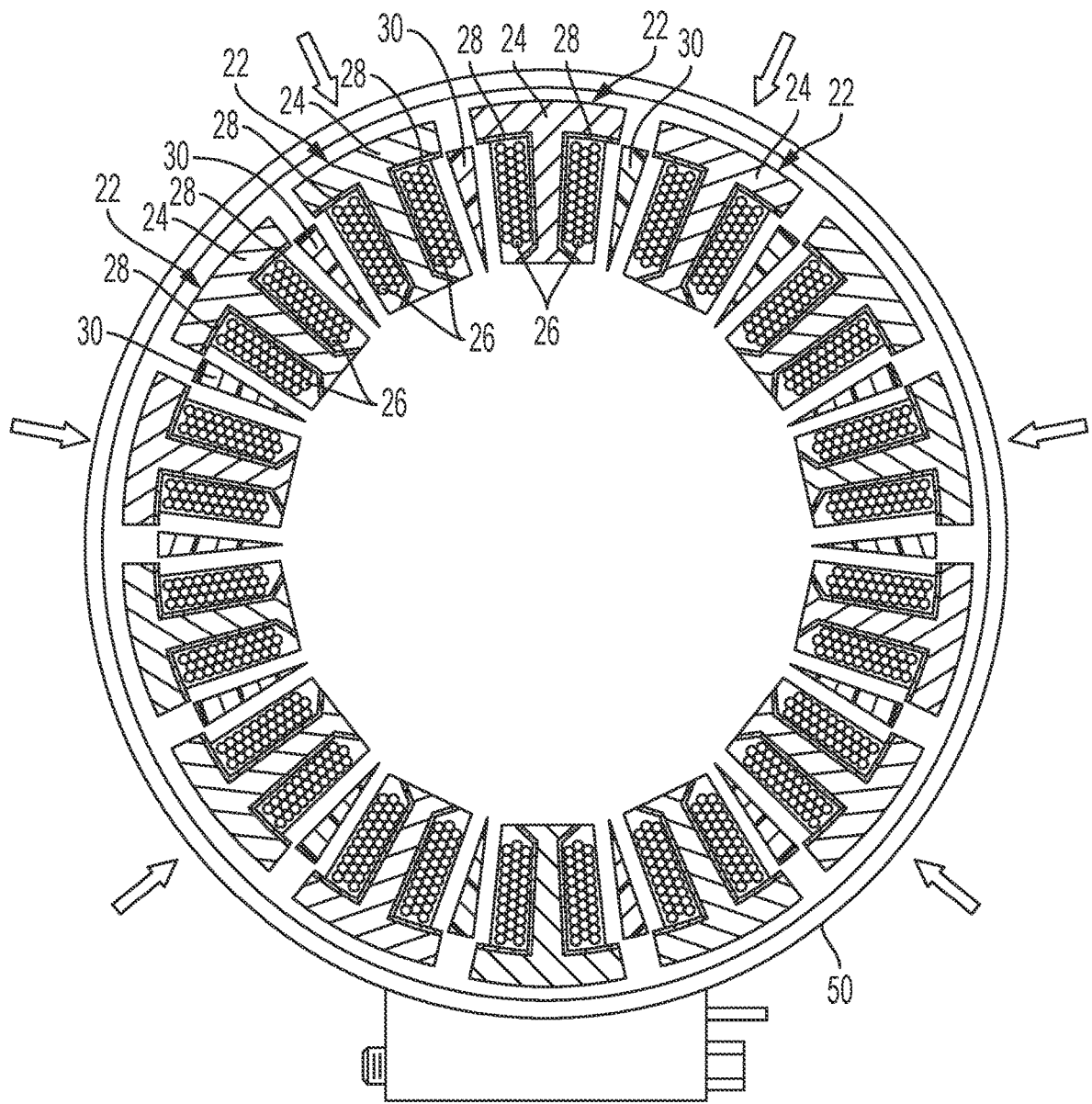
FIG. 6 is a view showing the components of the stator, including the motorettes and the wedges being assembled.

Certain terminology is used in the following description for convenience only and is not limiting. The words "inwardly" and "outwardly" refer to directions toward and away from the parts referenced in the drawings. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import. In the context of the air gaps being minimized, this means that they are 0.030 inches or less.

Referring to FIG. 1, an electric motor (emotor) 10 is schematically shown according to the present disclosure. The emotor 10 incudes a stator 20 as well as a rotor 40 rotatably mounted in the stator 20, with a shaft 42 extending from the rotor 40. The stator 20 is surrounded by a housing or casing 21. End covers, not shown, can also be applied as well as other mounting and electronics components.

Figure 8:
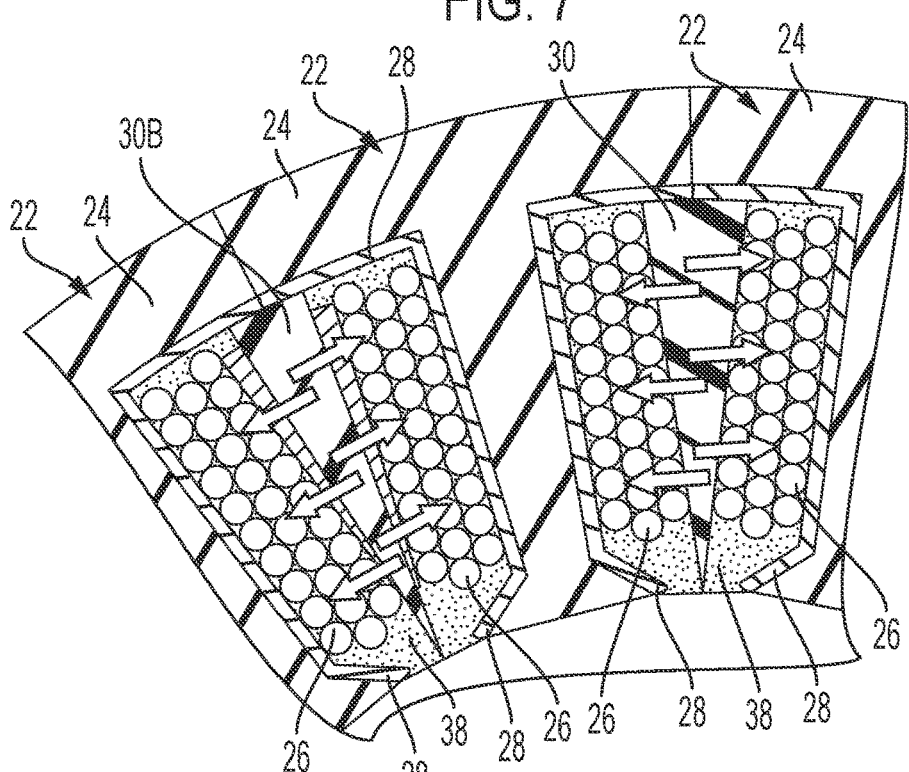
FIG. 8 is an enlarged detailed view of a cross section through the stator showing the windings being compressed by the wedges located between the motorettes as well as potting material surrounding the windings and the wedges.

Referring to FIGS. 2 and 8, the stator 20 includes a plurality of motorettes 22, each including a ferrous metal core segment 24 and a conductive winding 26 on the core segment 24. A single motorette is shown in FIG. 2 with the conductive winding 26 wrapped around the core segment 24. As shown in detail in FIG. 8, each of the ferrous metal core segments 24 is preferably coated or covered with an electric insulator 28 (also referred to as a bobbin) in the area of the conductive windings 26, and the conductive windings 26 are wound on the electric insulator 28. The insulator is preferably made of a thermally conductive material such as, for example, a thermally conductive polymer which could be PA46—nylon with glass fill mix, an electrically insulating paper, or a PET film. The conductive winding 26 is preferably made of coated copper wire. However, other conductive materials could be used.

Figure 7:
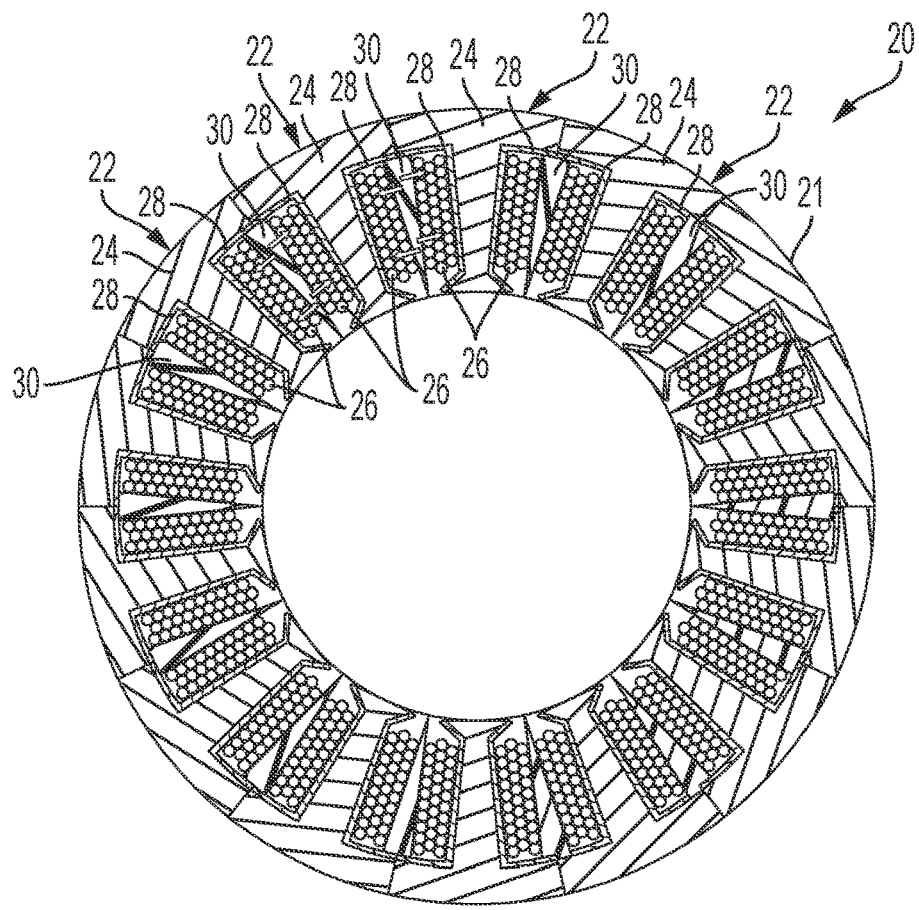
FIG. 7 is a cross-sectional view through the assembled stator enclosed in a casing.

As shown in FIGS. 6 and 7, a plurality of the motorettes 22 are arranged in a circular arrangement and a plurality of wedges 30 are provided with one of the wedges 30 being positioned in each interface between the conductive windings of adjacent ones of the motorettes 22 that press the conductive windings 26 of the adjacent ones of the motorettes 22 towards respective ones of the ferris metal core segments 24.

As shown in FIGS. 3A and 3B, the wedges 30 may have a constant taper. A first alternative form for the wedges 30A is shown in FIGS. 4A and 4B. The wedges 30A include two winding contact sides 32, 33 that extend between a radially outer end 34 and a radially inner end 35 of the wedge 30A, with the radially outer end 34 being wider than the radially inner end 35 and the winding contact sides 32, 33 each having a convex shape 36. This allows a targeting of more force to be applied in a medial area of the conductive windings 26. Alternatively, as shown in FIGS. 5A and 5B, the wedges 30B may include a profile 37 that is configured to apply greater circumferential force on adjacent ones of the conductive windings 26 in an area between radially outer and 32 and radially inner end 33. This profile 37 can be a simple rectangular profile, or a more complex stepped profile, depending upon where additional force needs to be applied to the conductive windings in order to reduce or eliminate the air gap between the conductive windings 26 and the respective stator core segment 24 or the electric insulator 28 thereon in the target area—indicated with a dot-dash line in FIG. 8. The same or different types of wedges 30, 30A, 30B can be used in a single stator 20.

Reducing or eliminating the air gap provides for better thermal efficiency in transferring heat from the conductive winding 26 during operation, improving the overall performance and efficiency of the emotor 10.

The wedges 30, 30A, 30B are preferably formed of a polymeric material such as glass filled Nylon mixes, or a ceramic material, or other thermally conductive material. The wedges 30, 30A, 30B are preferably also formed of a thermally conductive material.

As shown in detail in FIG. 8, a potting material 38, which is preferably also thermally conductive and electrically insulating, surrounds the conductive windings 26. This can be injected after the motorettes 22 and wedges 30, 30A, 30B have been assembled, the assembly process of which is described in further detail below.

Referring now to FIG. 6, a method of assembling the stator 20 of the emotor 10 is described. After the motorettes 22 are formed by wrapping the conductive windings 26 around the ferris metal core segments 24, a plurality of the motorettes 22 are arranged in a circular arrangement with a wedge 30, 30A, 30B being positioned in each interface between the conductive windings 26 of adjacent ones of the motorettes 22. As shown schematically in FIG. 6, this arrangement is provided within a clamping assembly 50 (represented as a clamping ring), and after arranging the motorettes 22 and the wedges 30, 30A, 30B in position, they are compressed together by the clamping ring 50 such that the wedges 30, 30A, 30B press the conductive windings 26 of adjacent ones of the motorettes 22 towards respective ones in the ferris metal core segments 24, or the electric insulators 28 thereon, to form the stator 20. The clamping ring 50 may be a permanent part of the final assembly or the compressed arrangement can be transferred into the housing or casing 21 which maintains the compressed motorettes 22 and wedges 30, 30A, 30B in position, as shown in FIG. 7, with the conductive windings 26 being pressed against the ferris metal core segments 24 or the insulator 28 thereon, reducing or eliminating any air gaps.

The electric insulator 28 is preferably formed of a polymeric material and is overmolded on the ferris metal core segments 24.

Further, potting material 38 can then be injected around the conductive windings 26 and the wedges 30, 30A, 30B once assembled to provided for more efficient heat transfer as well to reduce any movement of the components due to vibration.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMERALS 10 electric motor
20 stator 21 casing or housing
22 motorette
24 ferrous metal core segment
26 conductive winding
28 electric insulator
30, 30A, 30B wedge
32 winding contact side
33 winding contact side
34 radially outer end
35 radially inner end
36 convex shape
37 profile
38 potting
40 rotor
42 shaft
50 clamp ring

What is claimed is:

1. An electric motor, comprising:
a stator; and
a rotor rotatably mounted in the stator;
the stator including:
   a plurality of motorettes, each including a ferrous metal core segment, and a conductive winding on the core segment, the plurality of motorettes being arranged in a circular arrangement,
   a plurality of wedges that each include a non-tapered radially outermost surface that is wider than a pointed radially innermost surface, one of the wedges being positioned in each interface between the conductive windings of adjacent ones of the motorettes that presses the conductive windings of the adjacent ones of the motorettes towards respective ones of the ferrous metal core segments, wherein the plurality of wedges each include two winding contact sides that extend between a radially outer end and a radially inner end, and the radially inner end includes the pointed radially innermost surface which is radially aligned with a radially inner surface of the plurality of motorettes;
   an electric insulator on each of the ferrous metal core segments, the conductive windings being wound on the electric insulator; and
   a potting material surrounding the conductive windings.

2. The electric motor of claim 1, wherein the wedges each have a constant taper.

3. The electric motor of claim 1, wherein the winding contact sides have a convex shape.

4. The electric motor of claim 1, wherein the winding contact sides have a profile that is configured to apply a greater circumferential compression force on adjacent ones of the conductive windings in an area between the radially outer and radially inner ends.

5. The electric motor of claim 1, wherein the wedges are formed of a polymeric or ceramic material.

6. The electric motor of claim 1, wherein the wedges are formed of a thermally conductive material.

7. The electric motor of claim 1, wherein the potting material surrounding the conductive windings is thermally conductive and electrically insulating.

8. The electric motor of claim 1, wherein each ferrous metal core is mirrored about a central plane extending from a radially inner surface of the ferrous metal core to a radially outer surface of the ferrous metal core.

9. The electric motor of claim 8, wherein each ferrous metal core is generally T-shaped.

10. The electric motor of claim 8, wherein the central plane is positioned centrally circumferentially between circumferential ends of the ferrous metal core.

11. A method of assembling a stator of an emotor, the method comprising:
providing an electrical insulator on a ferrous metal core segment;
wrapping a conductive winding around the ferrous metal core segment and the electrical insulator to form a motorette;
arranging a plurality of motorettes in a circular arrangement with a wedge being positioned in each interface between the conductive windings of adjacent ones of the motorettes, wherein the wedges each include a non-tapered radially outermost surface that is wider than a pointed radially innermost surface, and the wedges each include two winding contact sides that extend between a radially outer end and a radially inner end, and the radially inner end includes the pointed radially innermost surface which is radially aligned with a radially inner surface of the plurality of motorettes;
compressing the motorettes together such the wedges press the conductive windings of the adjacent ones of the motorettes towards respective ones of the ferrous metal core segments to form the stator; and
injecting potting material around the conductive windings and the wedges.

12. The method of claim 11, wherein the ferrous metal core segment is overmolded with the electric insulator formed of a polymeric material.

13. The method of claim 11, wherein the wedges each have a constant taper.

14. The method of claim 11, wherein the winding contact sides have a convex shape.

15. The method of claim 11, wherein the winding contact sides have a profile that is configured to apply a greater circumferential compression force on adjacent ones of the conductive windings in an area between the radially outer and radially inner ends.

16. The method of claim 11, wherein the wedges are formed of a polymeric or ceramic material.

17. The method of claim 11, wherein the wedges are formed of a thermally conductive material.

* * * * *